UNITED STATES PATENT OFFICE.

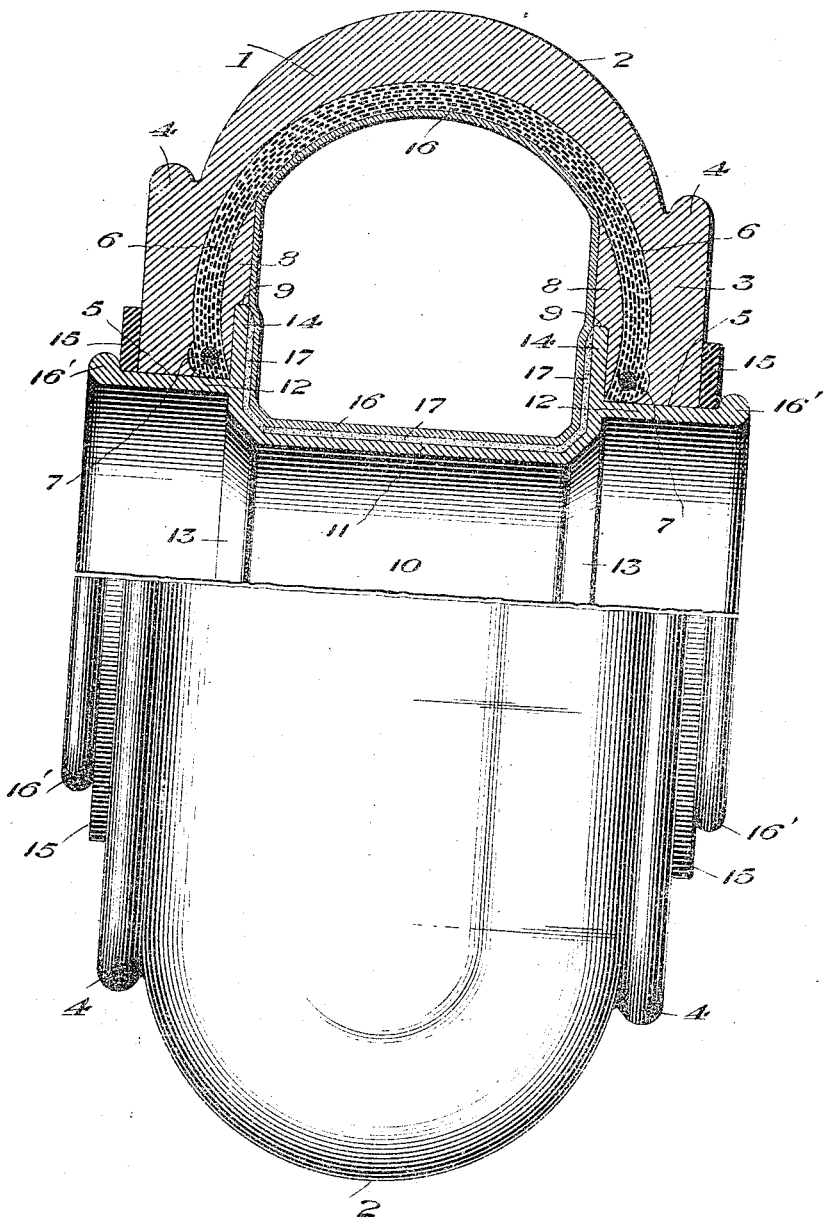

JOHN W. HUMMEL AND FREDERICK W. UHDE, OF PHILADELPHIA, PENNSYLVANIA.

TIRE.

1,272,664.

Specification of Letters Patent.    Patented July 16, 1918.

Application filed January 25, 1917. Serial No. 144,447.

*To all whom it may concern:*

Be it known that we, JOHN W. HUMMEL and FREDERICK W. UHDE, citizens of the United States, residing at Philadelphia, Pennsylvania, have invented certain new and useful Improvements in Tires, of which the following is a specification.

A principal object of the invention is to produce a combined cushion and pneumatic tire, which will operate ordinarily as a pneumatic tire, but which, if punctured, will have cushion features both to relieve the vehicle from shocks and to prevent injury to other parts of the tire, so that even when punctured the tire can be driven any reasonable distance without injury. A further object is to produce a tire which is not so easily punctured or injured as the ordinary pneumatic tire.

The invention as embodied in an exemplifying construction, shown in the accompanying drawing, consists in means for carrying out the foregoing and other objects, as will be explained. After considering the representative embodiment it will be evident that the invention is capable of embodiment in other forms, and we do not limit ourselves to details, except as claimed.

The drawing is a view, one-half in section and one-half in elevation, of a tire and suitable rim embodying the invention, the center section of the structure being broken away to permit showing the essential features on a large scale.

The tire shoe or casing 1 has a rounded tread portion 2 and thickened side walls 3, which have peripheral auxiliary tread portions 4. The side walls 3 have bases 5 resting on the rim, as later explained. Canvas reinforcements 6 of a suitable number of plies are molded into the tire and extended from one base 5 to the other, and the tire bases may be further strengthened by metal bands 7 of any suitable construction, secured to the inner edges of the reinforcements. In a preferred embodiment parts 8 of the rubber composition of the shoe are located inwardly from the canvas and these parts have shoulders 9.

A suitable rim 10 is provided having a central annulus 11 and annular extensions 12 of greater diameter to receive the tire bases 5. Curved or diagonally-arranged parts 13 of the rim connect the center annulus or tube base with the extensions 12. Intermediate the central portion 11 and the extensions 12 of the rim are arranged radial flanges 14, the edges of which support the shoulders 9 of the casing and the outer walls of which lie against the inner walls of the adjacent parts of the casing.

The tire casing is secured to the rim by split rings 15 or other suitable quickly demountable locking devices to coöperate with suitable parts of the rim, such as beads 16. This securing device acting substantially like the ordinary quick-demountable construction secures the bases 5 of the casing to the rim in the position shown in the drawing.

The inner tube 16 is normally inflated in the usual way and conforms to the inner casing and rim, as shown in the drawing, but preferably a protecting device, such as canvas 17, is interposed between the rim and tube, and this protecting canvas may be secured at one side to the casing or it may be cemented in the rim or may be free from both the casing and rim, as may be most desirable. Normally, the inner tube is inflated and the rounded tread 2 engages the road surface and supports the wheel, and its load, and extreme deflections of the tread are prevented by the side walls 3 which engage the road surface when the tread 2 is unusually deflected. This relieves the tread from load to a large extent and also prevents stone bruises or similar injuries to the fabric or inner tube which occur in ordinary tires when they strike forcibly obstructions in the road. Upon the occurrence of a puncture from any cause, the tread 2 is deflected and lies between the side walls 3, and the load is then supported by the peripheries 4 of the side walls, and injury to the center tread part 2 or to the inner tube which occurs in ordinary tires when they are run deflated is avoided. In this condition the rim flanges 14 assist largely in maintaining the shape of the side walls and enabling the part of the casing extending radially outward from the flanges to support part of the load.

We claim:—

In a tire-and-rim structure, the combination of a rim having a central space, a radial flange at each side thereof, said flanges extending outwardly a considerable distance and said rim also having a lateral extension at each side, a casing having side-walls seated on said extensions and lying against said flanges, and extending radially beyond the flanges, a rounded, central tread portion connecting the side walls and serving normally to carry the load, auxiliary treads formed at the peripheries of said side walls and an inflatable inner tube confined between the central part of the casing and the central space of the rim, whereby the load is normally carried pneumatically on said rounded tread portion, but when the inner tube is deflated the load is carried on said auxiliary tread portions, and the latter are stiffened and supported by said radial rim flanges.

JOHN W. HUMMEL.
FREDERICK W. UHDE.